(12) United States Patent
Bang

(10) Patent No.: US 10,389,231 B2
(45) Date of Patent: Aug. 20, 2019

(54) APPARATUS AND METHOD FOR PREVENTING REVERSE CURRENT IN DC-DC CONVERTER OF VEHICLE

(71) Applicant: HYUNDAI MOBIS CO., LTD., Seoul (KR)

(72) Inventor: Hyo Jin Bang, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 275 days.

(21) Appl. No.: 15/351,865

(22) Filed: Nov. 15, 2016

(65) Prior Publication Data

US 2017/0170719 A1   Jun. 15, 2017

(30) Foreign Application Priority Data

Dec. 14, 2015 (KR) ........................ 10-2015-0178048

(51) Int. Cl.
    *H02M 1/38* (2007.01)
    *H02M 3/335* (2006.01)
    *H02P 27/06* (2006.01)
    *H02M 1/32* (2007.01)
    *B60L 58/20* (2019.01)

(52) U.S. Cl.
    CPC ............... *H02M 1/38* (2013.01); *B60L 58/20* (2019.02); *H02M 1/32* (2013.01); *H02M 3/33584* (2013.01); *H02M 3/33592* (2013.01); *H02P 27/06* (2013.01); *B60L 2210/10* (2013.01); *B60L 2210/12* (2013.01); *B60L 2240/526* (2013.01); *Y02T 10/7005* (2013.01); *Y02T 10/7066* (2013.01); *Y02T 10/7233* (2013.01); *Y02T 10/92* (2013.01)

(58) Field of Classification Search
CPC ...... H02M 1/32; H02M 3/33592; H02M 1/38; H02M 3/33584; B60L 2210/10; B60L 58/20; B60L 2210/12; B60L 2240/526; H02P 27/06; Y02T 10/7066; Y02T 10/92; Y02T 10/7233; Y02T 10/7005
See application file for complete search history.

(56) References Cited

U.S. PATENT DOCUMENTS 6,101,104 A * 8/2000 Eng .................. H02M 1/38
                                                     363/127
6,970,339 B2 * 11/2005 Wong .................. H02M 3/1588
                                                     361/93.1

(Continued)

FOREIGN PATENT DOCUMENTS

| KR | 10-2008-0030522 | 4/2008 |
| KR | 10-2009-0129242 | 12/2009 |
| KR | 10-2015-0022109 | 3/2015 |

*Primary Examiner* — Pinping Sun
(74) *Attorney, Agent, or Firm* — H.C. Park & Associates, PLC

(57) ABSTRACT

An apparatus and a method for preventing a reverse current in a DC-DC converter of a vehicle including a measurement portion configured to measure an output voltage of the DC-DC converter of the vehicle; a verification portion configured to verify a difference between the output voltage and a preset reference output voltage at every preset period; and a controller configured to control a switch of a synchronous rectification circuit, which is implemented at a secondary side of a main transformer of the DC-DC converter, to be in an ON or OFF state according to the difference between the output voltage and the preset reference output voltage.

12 Claims, 9 Drawing Sheets

(56) References Cited

U.S. PATENT DOCUMENTS

| | | | | |
|---|---|---|---|---|
| 8,164,927 B2* | 4/2012 | Moon | .................. | H02M 1/32 |
| | | | | 363/21.13 |
| 9,331,593 B2* | 5/2016 | Hyugaji | ............ | H02M 3/33592 |
| 9,490,704 B2* | 11/2016 | Jang | .................. | H02M 3/285 |
| 2004/0219399 A1* | 11/2004 | Zhu | .................. | B60L 11/1887 |
| | | | | 429/431 |
| 2008/0080219 A1* | 4/2008 | Sohma | ............... | H02M 3/1588 |
| | | | | 363/89 |
| 2010/0067262 A1* | 3/2010 | Chen | ............... | H02M 3/33592 |
| | | | | 363/21.06 |
| 2011/0090717 A1* | 4/2011 | Lee | .................. | H02M 3/33584 |
| | | | | 363/21.02 |
| 2014/0028270 A1* | 1/2014 | Miyazaki | .................. | G05F 1/10 |
| | | | | 323/271 |
| 2014/0233272 A1* | 8/2014 | Fang | ............... | H02M 3/33592 |
| | | | | 363/21.14 |
| 2014/0254206 A1* | 9/2014 | Ou | .................. | H02M 3/33592 |
| | | | | 363/21.01 |
| 2015/0188438 A1* | 7/2015 | Kim | ............... | H02M 3/33576 |
| | | | | 307/9.1 |

* cited by examiner

→ ELECTRIC POWER FLOW

APPARATUS AND METHOD FOR PREVENTING REVERSE CURRENT IN DC-DC CONVERTER OF VEHICLE

CROSS-REFERENCE TO RELATED APPLICATION

This application claims priority from and the benefit of Korean Patent Application No. 10-2015-0178048, filed on Dec. 14, 2015, the disclosure of which is incorporated herein by reference in its entirety.

BACKGROUND

Field

Exemplary embodiments of the present disclosure relate to a direct current (DC)-DC converter of a vehicle, and more particularly, to an apparatus and a method for preventing a reverse current in a DC-DC converter of a vehicle, which are capable of preventing a reverse current from being generated in a DC-DC converter of a vehicle.

Discussion of the Background

A conventional electric power flow of a hybrid vehicle will be described with reference to FIG. 1.

FIG. 1 is a diagram for describing an electric power flow of a battery system of a conventional hybrid vehicle.

As shown in FIG. 1, when a hybrid vehicle runs normally, an electric motor is driven by receiving electric power from a high voltage battery through an inverter.

The driven electric motor delivers power to a power distributor to drive an engine so that the hybrid vehicle may run. A low voltage DC-DC converter (LDC) connected to the high voltage battery may charge a low voltage battery (a 12 volts (V) battery) to supply the electric power to low voltage electronic equipment loads in the hybrid vehicle.

When the hybrid vehicle reduces speed and runs on a downhill road (a downward grade) section, a rotational force is generated at the power distributor. With such a rotational force, the electric motor may operate as an electric power generator to charge the high voltage battery through the inverter. At this point, the LDC connected to the high voltage battery may charge the low voltage battery the same as when the hybrid vehicle runs normally, thereby supplying the electric power to the low voltage electronic equipment loads in the hybrid vehicle.

A configuration of a DC-DC converter generally provided in a hybrid vehicle is the same as shown in FIG. 2.

As shown in FIG. 2, a DC-DC converter 20 may include a high voltage H-bridge circuit 21 which controls a high voltage to be applied to a main transformer 22 for a predetermined time, and the main transformer 22 for an electrical insulation.

A synchronous rectification circuit 23 is included at a secondary side of the main transformer 22 to rectify an alternating current (AC) voltage. At this point, the synchronous rectification circuit 23 may employ a metal oxide semiconductor field effect transistor (MOSFET) to increase efficiency of a battery system of a hybrid vehicle.

Further, the low voltage (for example, 12V) rectified in the synchronous rectification circuit 23 is supplied to an electronic equipment load 25 and a low voltage battery 26 (for example, a 12 V battery) via an output filter circuit 24.

In addition, a voltage control device 27 is configured as an electric power circuit of such a DC-DC converter 20 to control an output voltage. The voltage control device 27 determines a supply voltage value V3, which is supplied to the high voltage H-bridge circuit 21, according to a difference between an output voltage value V1 of the DC-DC converter 20 and a preset reference output voltage value V2.

An output voltage of the DC-DC converter 20 is controlled in real time according to various conditions of the electronic equipment load 25 of the hybrid vehicle. When the electronic equipment load 25 is abruptly changed, there is a need to limit an output current or output electric power, and a situation may arise in which the output voltage of the DC-DC converter 20 should be abruptly decreased. At this point, the reference output voltage value V2 of the DC-DC converter 20 is adjusted to be low so that a supply current being supplied to the DC-DC converter 20 may be small.

When the output voltage of the DC-DC converter 20 is lower than that of the low voltage battery 26, the DC-DC converter 20 of a synchronous rectification type may operate as a bidirectional DC-DC converter. As a result, a reverse current $I_{out}$ of several hundred amperes (A) is generated at the DC-DC converter 20 in a direction as shown in FIG. 3A. For example, as a simulation result shown in FIG. 3B, when the reference output voltage value V2 of the DC-DC converter 20 is abruptly varied, a reverse current $I_{out}$ of about 600 A flows at the DC-DC converter 20. Such generation of the reverse current induces burning of a circuit and is also a cause of shortening a battery lifespan.

SUMMARY

Exemplary embodiments of the present invention provide an apparatus and a method for preventing a reverse current in a DC-DC converter of a vehicle by verifying a condition in which the reverse current is generated and then blocking in advance a cause of the reverse current.

The technical objectives of the inventive concept are not limited to the above disclosure; other objectives may become apparent to those of ordinary skill in the art based on the following descriptions.

An exemplary embodiment of the present invention discloses an apparatus for preventing a reverse current in a direct current (DC)-DC converter of a vehicle, including a measurement portion configured to measure an output voltage of the DC-DC converter of the vehicle; a verification portion configured to verify a difference between the output voltage and a preset reference output voltage at every preset period; and a controller configured to control a switch of a synchronous rectification circuit to be in an ON or OFF state according to the difference between the output voltage and the preset reference output voltage, which is implemented at a secondary side of a main transformer of the DC-DC converter.

An exemplary embodiment of the present invention discloses a method for preventing a reverse current in a DC-DC converter of a vehicle, including: measuring an output voltage of the DC-DC converter of the vehicle; verifying a difference between the output voltage and a preset reference output voltage at every preset period; and controlling a switch of a synchronous rectification circuit, which is implemented at a secondary side of a main transformer of the DC-DC converter, to be in an ON or OFF state according to the difference between the output voltage and the preset reference output voltage.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF EXEMPLARY EMBODIMENTS

Figure 1:
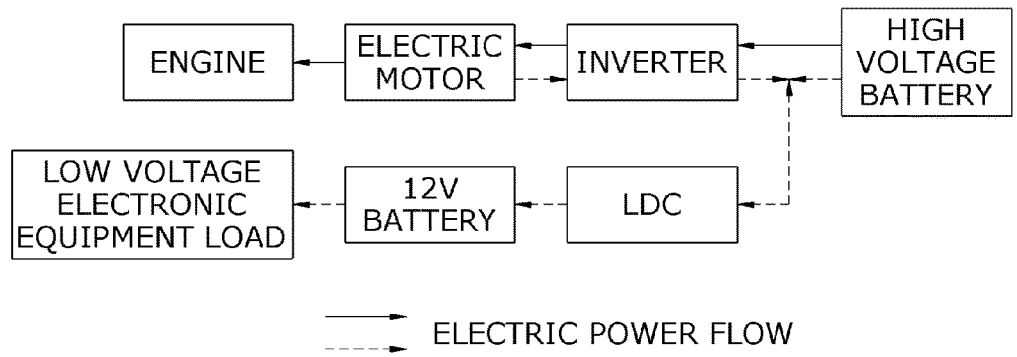
FIG. 1 is a diagram illustrating an electric power flow of a battery system of a conventional hybrid vehicle.
Figure 2:
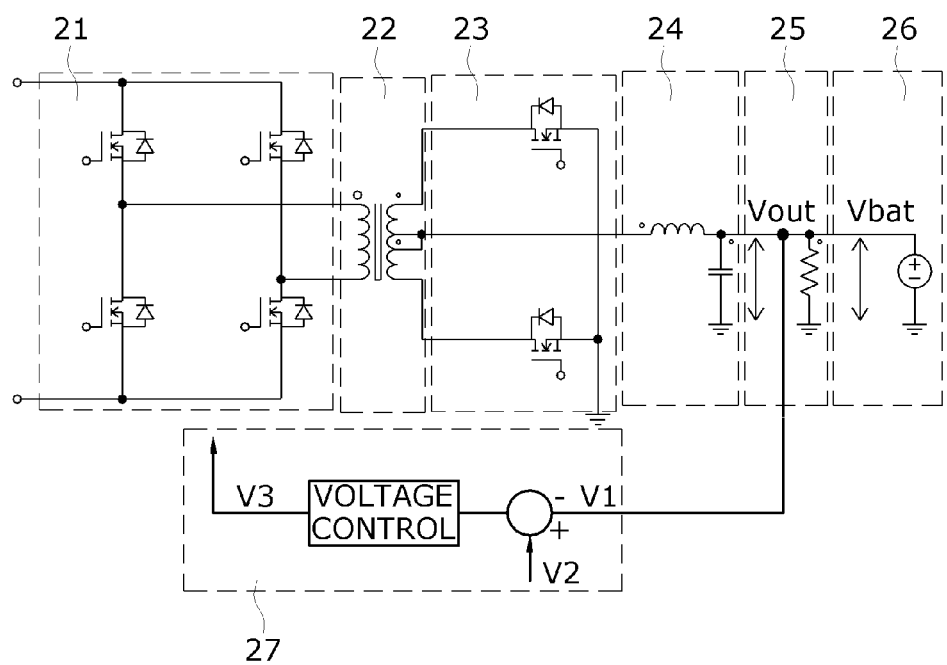
FIG. 2 is a diagram illustrating a circuit configuration of a direct current (DC)-DC converter provided in a conventional hybrid vehicle.
Figure 3A:
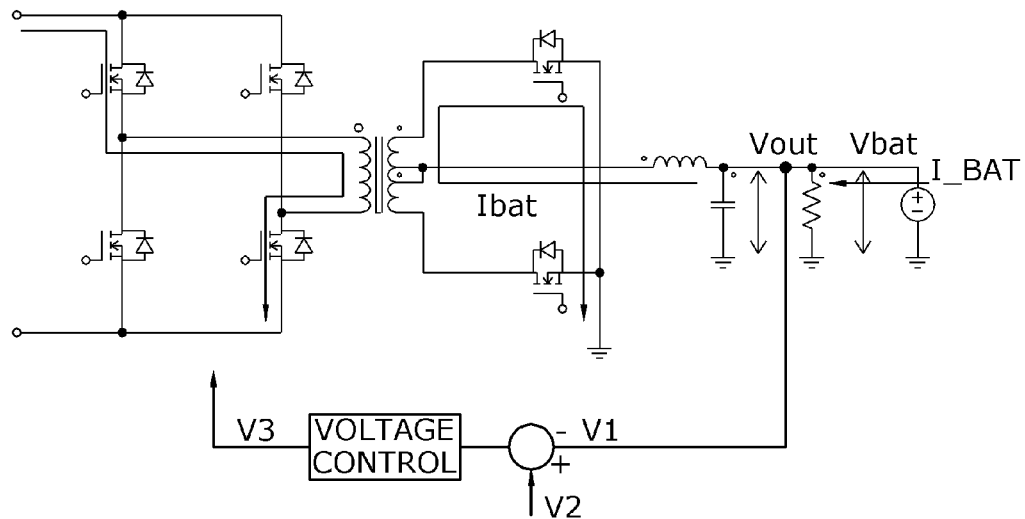
FIG. 3A and FIG. 3B are reference diagrams for describing a reverse current of the DC-DC converter of the conventional hybrid vehicle, respectively.
Figure 3B:
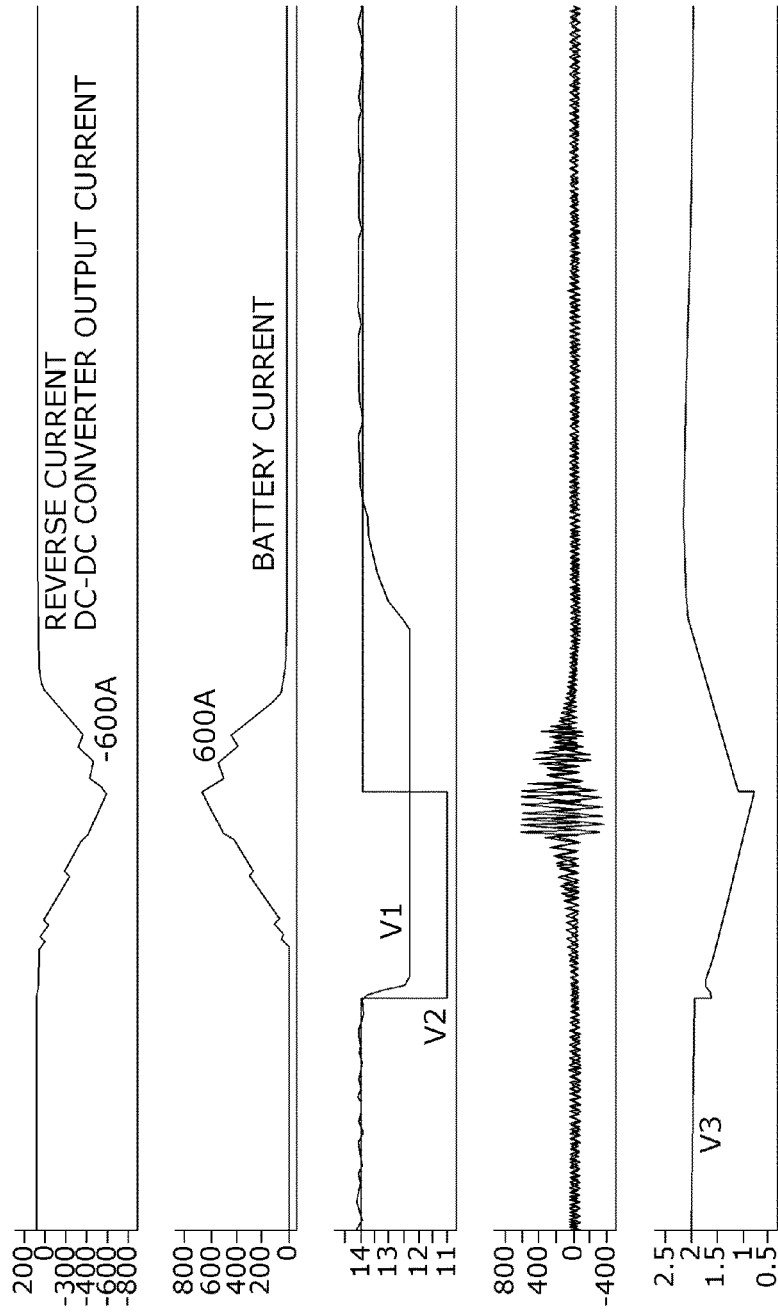

Hereinafter, exemplary embodiments of the present invention will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art. It should be noted that the drawings are not to precise scale and may be exaggerated in thickness of lines or sizes of components for descriptive convenience and clarity only.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The present invention relates to a technology for preventing a reverse current from being generated in a DC-DC converter of a vehicle. An exemplary direct current (DC)-DC converter including a reverse current prevention apparatus applicable to the present invention will be described below. The exemplary direct current (DC)-DC converter including a reverse current prevention apparatus may be used with one or more of the various exemplary embodiments.

Figure 4:
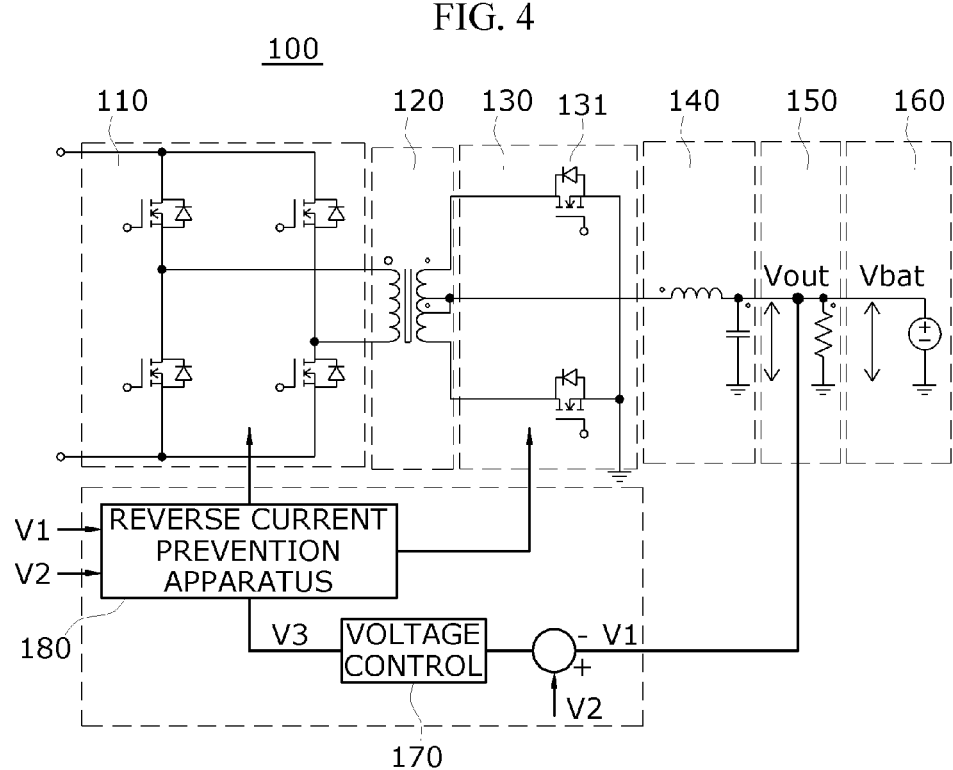
FIG. 4 is an entire circuit configuration diagram of a DC-DC converter including a reverse current prevention apparatus according to an exemplary embodiment.

FIG. 4 is an entire circuit configuration diagram of a DC-DC converter including a reverse current prevention apparatus according to an exemplary embodiment.

As shown in FIG. 4, a DC-DC converter 100 including a reverse current prevention apparatus according to the exemplary embodiment may include a high voltage H-bridge circuit 110 which controls a high voltage to be applied to a main transformer 120 for a predetermined time, and the main transformer 120 for an electrical insulation.

A synchronous rectification circuit 130 may be included at a secondary side of the main transformer 120 to rectify an alternating current (AC) voltage.

The synchronous rectification circuit 130 may employ a power switch 131 (for example, a metal oxide semiconductor field effect transistor (MOSFET), that is, a synchronous rectification (SR) switch) to increase efficiency of a battery system of a vehicle. A low voltage (for example, 12 volts (V)) rectified in the synchronous rectification circuit 130 is supplied to an electronic equipment load 150 and a low voltage battery 160 (for example, a 12 V battery) via an output filter circuit 140.

In addition, a voltage control device 170 is configured at an electric power circuit of such a DC-DC converter 100 to control an output voltage thereof. The voltage control device 170 determines a supply voltage value V3, which is supplied to the high voltage H-bridge circuit 110, according to a difference between an output voltage value V1 of the DC-DC converter 100 and a preset reference output voltage value V2. Here, the reference output voltage value V2 is an output voltage reference of the DC-DC converter 100 for an eco-friendly vehicle, and generally, may be set to a voltage (for example, 13.9 V) higher than that of the low voltage battery 160. For example, a maximum value of the reference output voltage value V2 may be 15.1 V, and a minimum value thereof may be determined to the output voltage value V1 when a value obtained by subtracting the reference output voltage value V2 from the output voltage value V1 is greater than 0.5 V.

In particular, the voltage control device 170 compares the output voltage value V1 of the DC-DC converter 100 with the reference output voltage value V2, and then transmits a signal of the supply voltage value V3 to the high voltage H-bridge circuit 110. Consequently, according to a level of the supply voltage value V3, a time for applying an AC voltage from the high voltage H-bridge circuit 110 to the main transformer 120 is determined.

The output voltage value V1 of the DC-DC converter 100 is controlled in real time according to various conditions of the electronic equipment load 150 of a vehicle. For example, when the electronic equipment load 150 is abruptly changed, there is a need to limit an output current or output electric power, and a situation may arise in which an output voltage of the DC-DC converter 100 should be abruptly decreased. At this point, the reference output voltage value V2 of the DC-DC converter 100 is adjusted to be a low value so that a supply current being supplied to the DC-DC converter 100 may be low. When the reference output voltage value V2 is abruptly decreased for the purpose of limiting an abrupt voltage or an abrupt current, an output voltage Vout of the DC-DC converter 100 is to be lowered than a voltage Vbat of the low voltage battery 160, and thus, a reverse current of several hundred amperes (A) may be generated.

Therefore, the DC-DC converter 100 according to an exemplary embodiment further includes a reverse current prevention apparatus 180. The reverse current prevention apparatus 180 according to an exemplary embodiment verifies the output voltage value V1 of the DC-DC converter 100, the reference output voltage value V2 thereof, and the supply voltage value V3 determined according to a difference between the output voltage value V1 of the DC-DC converter 100 and the reference output voltage value V2 thereof, and controls the switch 131 (MOSFET) of the synchronous rectification circuit 130 to be in an ON or OFF state to prevent a reverse current from being generated in the DC-DC converter 100.

Hereinafter, a reverse current prevention technique of the DC-DC converter of the vehicle according to an exemplary embodiment will be described in detail with reference to FIGS. 5 and 8.

Figure 5:
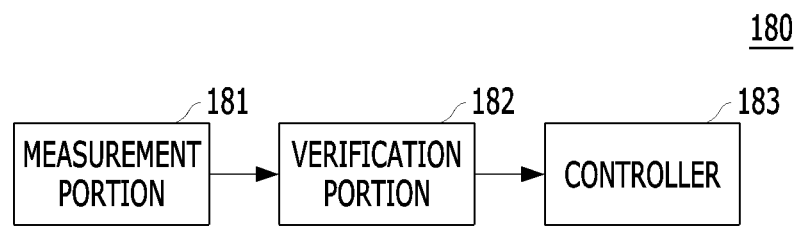
FIG. 5 is a block diagram illustrating a configuration with respect to the reverse current prevention apparatus of the DC-DC converter in a vehicle according to an exemplary embodiment.

FIG. 5 is a block diagram of the reverse current prevention apparatus of the DC-DC converter of the vehicle according to an exemplary embodiment.

As shown in FIG. 5, the reverse current prevention apparatus 180 of the DC-DC converter of the vehicle includes a measurement portion 181, a verification portion 182, and a controller 183.

The measurement portion 181 measures the output voltage value V1 of the DC-DC converter 100. At this point, the measurement portion 181 may be a voltage sensor which is provided at a predetermined position of a circuit of the DC-DC converter 100 to measure a voltage output therefrom.

The verification portion 182 compares the output voltage value V1 of the DC-DC converter 100 measured at the measurement portion 181 with the preset reference output voltage value V2. At this point, the verification portion 182 verifies whether the output voltage value V1 of the DC-DC converter 100 is less than the reference output voltage value V2 (that is, V1<V2).

At this point, the verification portion 182 may compare the output voltage value V1 of the DC-DC converter 100 with the preset reference output voltage value V2 at every preset period.

Preferably, the verification portion 182 may compare the output voltage value V1 of the DC-DC converter 100 with the reference output voltage value V2 by considering a certain error value. Here, the error value is a preset value and may be changed by a developer and the like.

In particular, the verification portion 182 compares a value obtained by subtracting a preset error value (for example, 0.2 V) from the reference output voltage value V2 with the output voltage value V1 of the DC-DC converter 100, and verifies whether the output voltage value V1 of the DC-DC converter 100 is less than the obtained value (that is, V1<V2−0.2). In an exemplary embodiment of the present disclosure, a situation will be described below in which voltage values are compared with each other in consideration of an error value.

When the output voltage value V1 of the DC-DC converter 100 is verified to be less than the value obtained by subtracting the error value 0.2 V from the reference output voltage value V2 (that is, V1<V2−0.2) based on the verification result of the verification portion 182, the controller 183 controls the switch 131 of the synchronous rectification circuit 130 to be in an OFF state. In particular, when the output voltage value V1 of the DC-DC converter 100 is verified to be less than the value obtained by subtracting the error value 0.2 V from the reference output voltage value V2 (that is, V1<V2−0.2), the controller 183 determines that there may be possibility of generation of a reverse current at the DC-DC converter 100 and controls the switch 131 of the synchronous rectification circuit 130 to be in the OFF state to prevent the reverse current from being generated. Hereinafter, such an operation will be referred to as a control operation according to Mode 1.

When controlling the switch 131 of the synchronous rectification circuit 130 to be in the OFF state according to Mode 1 (that is, it is determined to be less than the value obtained by subtracting the error value 0.2 V from the reference output voltage value V2), the controller 183 counts up a number of times of operation N with respect to such operations. That is, based on the verification result of the verification portion 182 at every preset period, the controller 183 may count up and accumulate the number of times of operation N whenever controlling the switch 131 of the synchronous rectification circuit 130 to be in an OFF state according to Mode 1 (that is, N=N+1).

In addition, the controller 183 stores a value (a variation amount of a supply voltage, that is, ΔV=V3−V3_old), which is obtained by subtracting a prestored previous supply voltage value V3_old from a supply voltage value V3 that is determined through a current output voltage value V1 of the DC-DC converter 100 and the reference output voltage value V2 thereof, in a separate memory. When a previous variation amount of the supply voltage ΔV_old has been stored in the separate memory, the controller 183 stores the variation amount of the supply voltage ΔV which is currently obtained at the previous variation amount of the supply voltage ΔV_old (that is, ΔV_old=ΔV).

When the counted number of times of operation N is less than a preset number of times (a first number of times) X, the controller 183 controls the switch 131 of the synchronous rectification circuit 130 to be in an ON or OFF state based on the verification result of the verification portion 182 at every preset period. Here, the first number of times X may be set and changed by a developer in advance. Also, the first number of times X may be set in consideration of a battery system of a vehicle that is verified through a pre-experiment, and specifically, in consideration of a result value that is obtained by dividing a transient response time is of the DC-DC converter 100 by a control period (a preset period).

When the number of times of operation N is equal to or greater than the preset first number of times X, the controller 183 controls the switch 131 of the synchronous rectification circuit 130 to be in the OFF state regardless of the verification result of the verification portion 182. The reason for that is that the battery system of the vehicle may be determined to be in a transient state (that is, a state in which a balance state of an electric power system could not be maintained any more due to generation of disturbance such as variation of a load or a line accident) when a number of times of operations N that the output voltage value V1 of the DC-DC converter 100 is verified through the verification portion 182 to be less than the value obtained by subtracting the error value 0.2 V from the reference output voltage value V2 is equal to or greater than the preset first number of times X.

The controller 183 determines the previous supply voltage value V3_old to a current supply voltage value V3 (that is, V3_old=V3) that is calculated using a currently measured output voltage value V1 of the DC-DC converter 100 and a currently set reference output voltage value V2 thereof. At this point, the determined previous supply voltage value V3_old may be stored in the separate memory, and the stored previous supply voltage value V3_old may be stored without being deleted even when electric power is blocked (for example, starting of a vehicle is turned off).

In addition, the controller 183 stores a value (a variation amount of the supply voltage, that is, ΔV=V3−V3_old), which is obtained by subtracting the prestored previous supply voltage value V3_old from the supply voltage value V3 determined through the current output voltage value V1 of the DC-DC converter 100 and the reference output voltage value V2 thereof, in the separate memory. When the previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

Through such a process, when a reverse current of the DC-DC converter 100 is considered to be generated, the controller 183 may control the switch 131 of the synchronous rectification circuit 130 to be in the OFF state so that possibility of generation of the reverse current of the DC-DC converter 100 may be prevented in advance.

When the output voltage value V1 of the DC-DC converter 100 is verified to be equal to or greater than the value obtained by subtracting the error value 0.2 V from the reference output voltage value V2 based on the verification result of the verification portion 182 (that is, V1≥V2−0.2), the controller 183 compares the current supply voltage value V3 with the previous supply voltage value V3_old. The reason for this is that when the output voltage value V1 of the DC-DC converter 100 is verified to be equal to or greater than the value obtained by subtracting the error value 0.2 V from the reference output voltage value V2 (that is, V1≥V2−0.2), a situation results in which a reverse current is not generated at the DC-DC converter 100 according to the comparison result of the current output voltage value V1 and the reference output voltage value V2. However, a situation may arise in which the switch 131 of the synchronous rectification circuit 130 should be controlled to be in an ON or OFF state for the reason described below.

Generally, a difference exists between the reference output voltage value V2 and an output voltage (that is, Vout=V1) of the DC-DC converter 100, wherein the reference output voltage value V2 is a reference value that is varied according to a situation of a system. Here, when the reference value V2 is instantaneously varied, the output voltage Vout converges on the reference output voltage value V2. Consequently, the switch 131 of the synchronous rectification circuit 130 should be controlled to be in the OFF state when a value obtained by subtracting a preset error value from the reference output voltage value V2 is controlled to be greater than the output voltage value V1, but when a value obtained by subtracting the preset error value from the reference output voltage value V2 is controlled to be equal to or less than the output voltage value V1, a state of the switch 131 of the synchronous rectification circuit 130 should be controlled through the verification process once more instead of unconditionally controlling the switch 131 of the synchronous rectification circuit 130 to be in the OFF state.

In particular, when the output voltage value V1 of the DC-DC converter 100 is verified to be equal to or greater than the value obtained by subtracting the error value 0.2 V from the reference output voltage value V2 (that is, V1≥V2−0.2), the controller 183 compares the current supply voltage value V3, which is determined according to a difference between the output voltage value V1 of the DC-DC converter 100 and the reference output voltage value V2 thereof, with the previously (shortly before) determined supply voltage value V3_old.

When the current supply voltage value V3 is verified to be less than the previous supply voltage value V3_old, the controller 183 may control the switch 131 of the synchronous rectification circuit 130 to be in the OFF state. That is, when the verification portion 182 verifies that the output voltage value V1 of the DC-DC converter 100 is equal to or greater than the value obtained by subtracting the error value 0.2 V from the reference output voltage value V2 (that is, V1≥V2−0.2) and that the current supply voltage value V3 is less than the previous supply voltage value V3_old (that is, V3<V3_old), the controller 183 may control the switch 131 of the synchronous rectification circuit 130 to be in the OFF state.

At this point, the controller 183 determines the previous supply voltage value V3_old to the current supply voltage value V3 calculated using the currently measured output voltage value V1 of the DC-DC converter 100 and the currently set reference output voltage value V2 thereof (that is, V3_old=V3), and counts up the number of times of operation N (that is, N=N+1).

In addition, the controller 183 stores a value (a variation amount of the supply voltage, that is, ΔV=V3−V3_old), which is obtained by subtracting the prestored previous supply voltage value V3_old from the supply voltage value V3 determined through the current output voltage value V1 of the DC-DC converter 100 and the reference output voltage value V2 thereof, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

After the verification portion 182 verifies that the output voltage value V1 of the DC-DC converter 100 is equal to or greater than the value obtained by subtracting the error value 0.2 V from the reference output voltage value V2 (that is, V1≥V2−0.2), the controller 183 may determine whether to control the switch 131 of the synchronous rectification circuit 130 to be in an OFF state or an ON state according to a number of times the current supply voltage value V3 is verified to be less than the previous supply voltage value V3_old (that is, V3<V3_old).

In particular, when the current supply voltage value V3 is verified to be less than the previous supply voltage value V3_old (that is, V3<V3_old) based on the comparison result, the controller 183 counts up the number of times (the number of times of verification) that the verification portion 182 verifies that the current supply voltage value V3 is less than the previous supply voltage value V3_old (that is, Y=Y+1). That is, when the verification portion 182 verifies that the output voltage value V1 of the DC-DC converter 100 is equal to or greater than the value obtained by subtracting the error value 0.2 V from the reference output voltage value V2 (that is, V1≥V2−0.2), the controller 183 may count up and accumulate the number of times of verification Y whenever the current supply voltage value V3 is verified to be less than the previous supply voltage value V3_old (that is, V3<V3_old).

Further, it is verified whether the counted number of times of verification Y (that is, the accumulated number of times that the output voltage value V1 of the DC-DC converter 100 is verified to be equal to or greater than the value obtained by subtracting the error value 0.2 V from the reference output voltage value V2, and the current supply voltage value V3 is verified to be less than the previous supply voltage value V3_old) exceeds a preset number of times (a second number of times) Z (that is, Y>Z). Here, the second number of times Z is a preset value, and may be varied according to a response characteristic of a product (a vehicle battery system or a DC-DC converter of a vehicle battery system) and may be preset and changed in advance so as to recognize a voltage drop.

Figure 6:
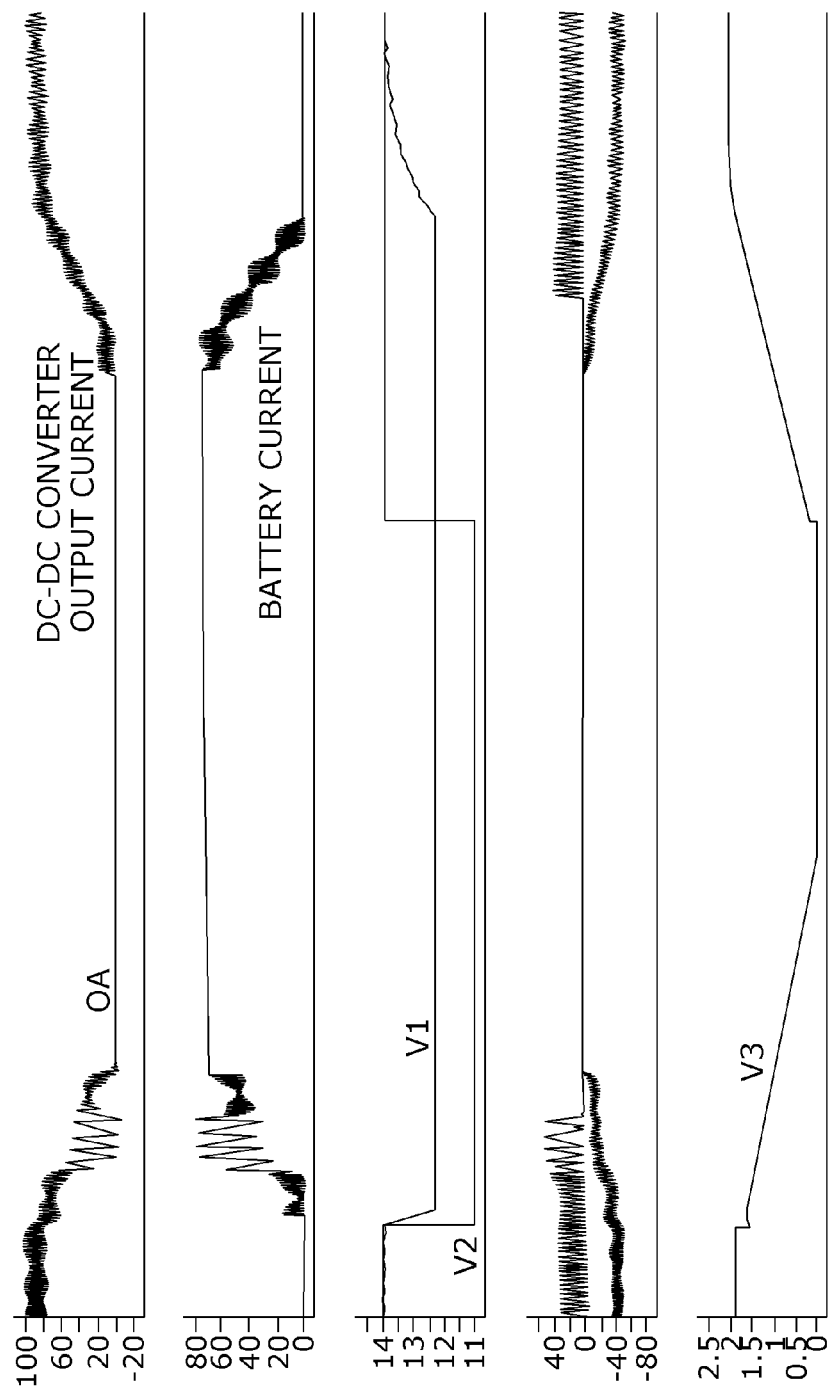
FIG. 6 is a diagram illustrating a simulation result of a situation in which a switch of a synchronous rectification circuit is controlled to be in an OFF state in Mode 2 according to an exemplary embodiment.

When the number of times of verification Y exceeds the second number of times Z (that is, Y>Z), the controller 183 controls the switch 131 of the synchronous rectification circuit 130 to be in the OFF state. That is, when the accumulated number of times of verification Y that the output voltage value V1 of the DC-DC converter 100 is verified to be equal to or greater than the value obtained by subtracting the error value 0.2 V from the reference output voltage value V2 (V1≥V2−0.2) and the current supply voltage value V3 is verified to be less than the previous supply voltage value V3_old through the verification portion 182 exceeds the second number of times Z (that is, Y>Z), the controller 183 controls the switch 131 of the synchronous rectification circuit 130 to be in the OFF state. Hereinafter, such an operation will be referred to as a control operation according to Mode 2. As described above, when the switch 131 of the synchronous rectification circuit 130 is controlled to be in the OFF state according to Mode 2, an output current of the DC-DC converter 100, a current of the low voltage battery 160, the output voltage value V1 of the DC-DC converter 100, the reference output voltage value V2, and the supply voltage value V3 may be varied as shown in FIG. 6.

At this point, when controlling the switch 131 of the synchronous rectification circuit 130 to be in the OFF state according to Mode 2, the controller 183 determines the previous supply voltage value V3_old to a current supply voltage value V3 that is calculated using a currently measured output voltage value V1 of the DC-DC converter 100 and a currently set reference output voltage value V2 thereof (that is, V3_old=V3), and then resets the number of times of verification Y to 0.

In addition, the controller 183 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

When the current supply voltage value V3 is verified to be equal to or greater than the previous supply voltage value V3_old (that is, V3≥V3_old) on the basis of the comparison result of the current supply voltage value V3 and the previous supply voltage value V3_old, the controller 183 controls the switch 131 of the synchronous rectification circuit 130 to be in an ON state. That is, the controller 183 maintains the ON state when the switch 131 of the synchronous rectification circuit 130 is previously in the ON state, whereas it switches the OFF state to the ON state when the switch 131 of the synchronous rectification circuit 130 is previously in the OFF state.

At this point, the controller 183 determines the previous supply voltage value V3_old to the current supply voltage value V3 that is calculated using the currently measured output voltage value V1 of the DC-DC converter 100 and the currently set reference output voltage value V2 thereof (that is, V3_old=V3). Also, the controller 183 resets the number of times of operation N and the number of times of verification Y to 0, respectively.

In addition, the controller 183 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

When the current supply voltage value V3 is verified to be less than the previous supply voltage value V3_old (that is, V3<V3_old) on the basis of the comparison result of the current supply voltage value V3 and the previous supply voltage value V3_old to count up (accumulate) the number of times of verification Y, and the counted (accumulated) number of times of verification Y is equal to or less than the second number of times Z, the controller 183 controls the switch 131 of the synchronous rectification circuit 130 to be in the ON state. Similarly, in this case, the controller 183 determines the previous supply voltage value V3_old to the current supply voltage value V3 that is calculated using the currently measured output voltage value V1 of the DC-DC converter 100 and the currently set reference output voltage value V2 thereof (that is, V3_old=V3), and resets the number of times of operation N being counted until now to 0.

Further, the controller 183 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2 thereof, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

Figure 7:
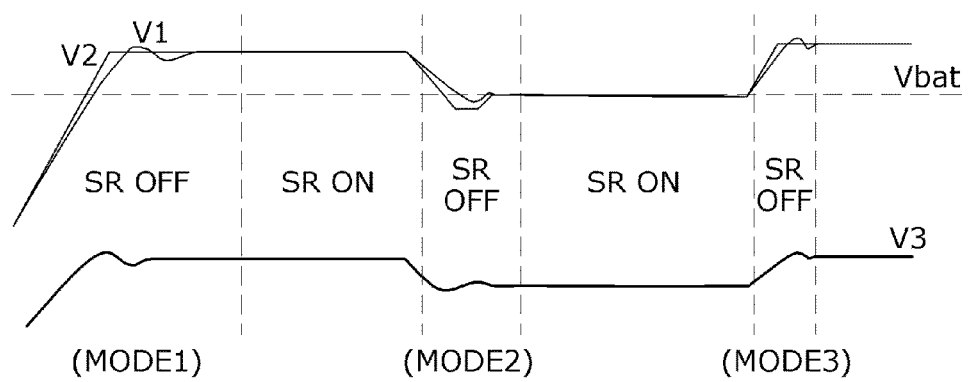
FIG. 7 is a diagram illustrating voltage level variation of each of an output voltage of the DC-DC converter, a reference output voltage, and a supply voltage according to a state control of the switch of the synchronous rectification circuit in Mode 1 and Mode 2 according to an exemplary embodiment.

Through the above described process, the controller 183 may adaptively control the switch 131 of the synchronous rectification circuit 130 to be in the OFF or ON state using the output voltage value V1 of the DC-DC converter 100, the reference output voltage value V2 thereof, and the supply voltage value V3. For example, voltage levels of the output voltage value V1 of the DC-DC converter 100, the reference output voltage value V2 thereof, and the supply voltage value V3 may be shown as in FIG. 7 according to a state control of the switch 131 of the synchronous rectification circuit 130 in Mode 1 and Mode 2.

As described above, in accordance with an exemplary embodiment, generation of a reverse current in a DC-DC converter of a vehicle may be prevented by verifying in advance a condition in which the reverse current is generated and blocking a cause related thereto using variables that could be verified through a conventional sensing circuit of the DC-DC converter of a synchronous rectification type in the vehicle.

Moreover, in accordance with an exemplary embodiment, a separate hardware circuit is not added or changed and a sensor for sensing a reverse current is omitted so as to prevent a reverse current in a DC-DC converter of a vehicle so that the number of components may be reduced to realize reduction of manufacturing costs, a simplified process, and weight reduction.

Figure 8:
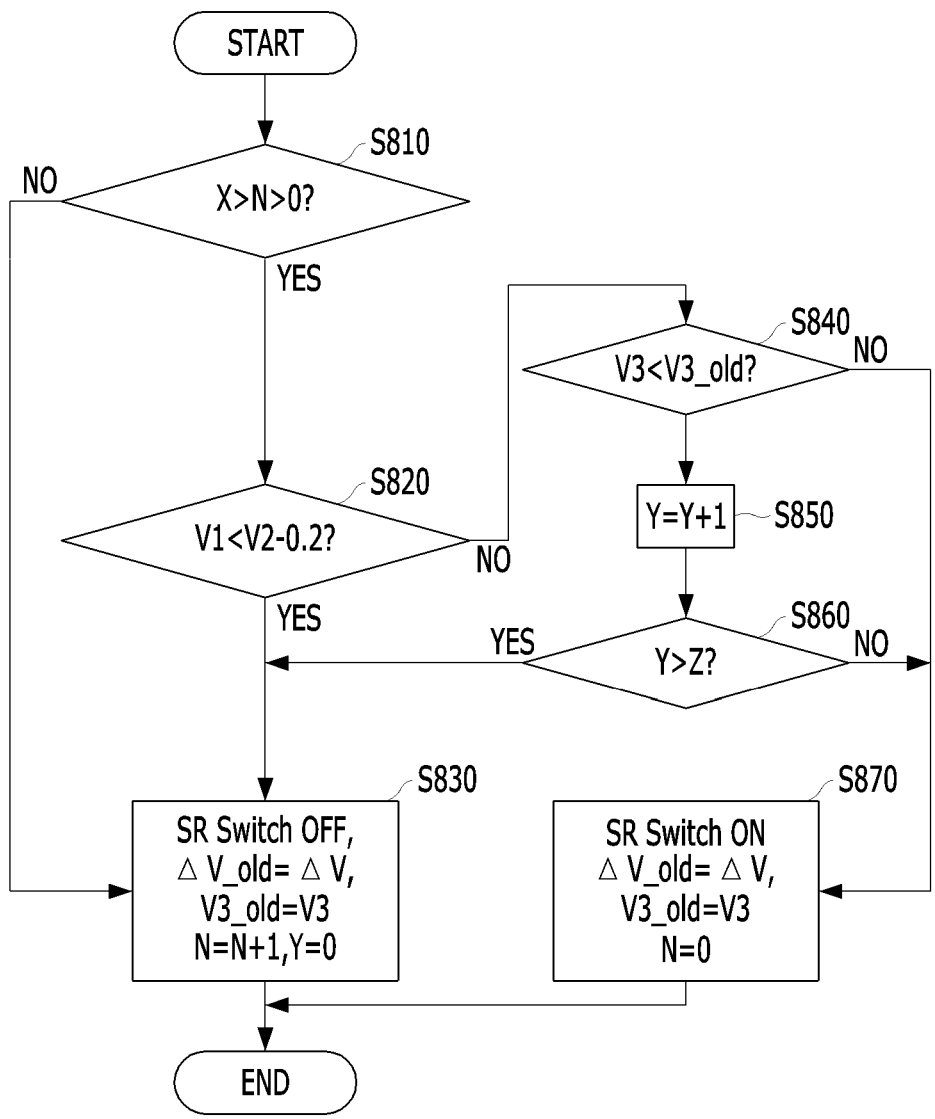
FIG. 8 is an operational flow chart of a reverse current prevention method of the DC-DC converter of the vehicle according to an exemplary embodiment.

FIG. 8 is a flow chart of a reverse current prevention method in a DC-DC converter of a vehicle according to an exemplary embodiment of the present invention.

Hereinafter, unless specifically noted, steps S810 to S870 are considered as being performed in the reverse current prevention apparatus 180 of the DC-DC converter implemented at the battery system of the vehicle.

First, the reverse current prevention apparatus 180 verifies whether a number of times N (a number of times of operations) that the switch 131 of the synchronous rectification circuit 130 is forcibly controlled to be in an OFF state is equal to or less than a preset first number of times X in Step S810. Hereinafter, the number of times of operation N and the preset first number of times X will be described in detail through the following operation description.

When the number of times of operation N is less than the first number of times X, the reverse current prevention apparatus 180 compares a value, which is obtained by subtracting a preset error value (for example, 0.2 V) from a reference output voltage value V2, with an output voltage value V1 of the DC-DC converter 100, and verifies whether the output voltage value V1 of the DC-DC converter 100 is small, that is, V1<V2−0.2 in Step S820. Here, the error value is a preset value, and may be changed by a developer and the like. At this point, the reverse current prevention apparatus 180 may compare the output voltage value V1 of the DC-DC converter 100 with the reference output voltage value V2 that is preset, at every preset period.

Based on the verification result in Step S820, when the output voltage value V1 of the DC-DC converter 100 is verified to be less than the value that is obtained by subtracting the error value 0.2 V from the reference output voltage value V2 (that is, V1<V2−0.2), the reverse current prevention apparatus 180 controls the switch 131 (for example, an SR Switch) of the synchronous rectification circuit 130 to be in an OFF state in Step S830. In particular, when the output voltage value V1 of the DC-DC converter 100 is verified to be less than the value that is obtained by subtracting the error value 0.2 V from the reference output voltage value V2 (that is, V1<V2−0.2), the reverse current prevention apparatus 180 determines that there is possibility of generation of a reverse current at the DC-DC converter 100 to control the switch 131 of the synchronous rectification circuit 130 to be in the OFF state, thereby preventing the generation of the reverse current. Hereinafter, such an operation will be referred to as a control operation according to Mode 1.

When controlling the switch 131 of the synchronous rectification circuit 130 to be in the OFF state according to Mode 1 (that is, it is verified as being less than the value that is obtained by subtracting the error value 0.2 V from the reference output voltage value V2), the reverse current prevention apparatus 180 counts up the number of times of operation N with respect to such an operation. That is, on the basis of the verification result in Step S820 at every preset period, the reverse current prevention apparatus 180 may count up and accumulate the number of times of operation N (that is, N=N+1) whenever controlling the switch 131 of the synchronous rectification circuit 130 to be in the OFF state according to Mode 1.

The reverse current prevention apparatus 180 determines a previous supply voltage value V3_old to a current supply voltage value V3 that is calculated using a currently measured output voltage value V1 of the DC-DC converter 100 and a currently set reference output voltage value V2 (that is, V3_old=V3). At this point, the determined previous supply voltage value V3_old may be stored in a separate memory, and the stored previous supply voltage value V3_old may be stored in the separate memory without being deleted therefrom even when electric power is blocked (for example, starting of a vehicle is turned off).

In addition, the reverse current prevention apparatus 180 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2 thereof, in the separate memory. When the previous variation amount of the supply voltage ΔV_old has been stored in the separate memory, the controller 183 stores the variation amount of the supply voltage ΔV being currently obtained at the previous variation amount of the supply voltage ΔV_old (that is, ΔV_old=ΔV).

Through such a process, when a reverse current of the DC-DC converter 100 is considered to be generated, the reverse current prevention apparatus 180 may control the switch 131 of the synchronous rectification circuit 130 to be in the OFF state so that possibility of generation of the reverse current of the DC-DC converter 100 may be prevented in advance.

After controlling the switch 131 of the synchronous rectification circuit 130 to be in the OFF state, the reverse current prevention apparatus 180 feeds back to Step S810, and controls the switch 131 of the synchronous rectification circuit 130 to be in an ON or OFF state according to the verification result in Step S820 at every preset period when the counted number of times of operation N is less than a preset number of times (a first number of times) X. Here, the first number of times X may be set and changed by a developer in advance. Also, the first number of times X may be set in consideration of a battery system of a vehicle that is verified through a pre-experiment, and specifically, in consideration of a result value obtained by dividing a transient response time is of the DC-DC converter 100 by a control period (a predetermined period).

When the number of times of operation N is equal to or greater than the preset first number of times X based on the verification result in Step S810, the reverse current prevention apparatus 180 performs Step S830 in which the switch 131 of the synchronous rectification circuit 130 is controlled to be in the OFF state instead of performing Step S820. The reason for that is that the battery system of the vehicle may be determined to be in a transient state (that is, a state in which a balance state of an electric power system could not be maintained any more due to generation of disturbance such as variation of a load or a line accident) when the number of times of operation N that the output voltage value V1 of the DC-DC converter 100 is verified to be less than the value obtained by subtracting the error value 0.2 V from the reference output voltage value V2 is equal to or greater than the preset first number of times X. Meanwhile, when the output voltage value V1 of the DC-DC converter 100 is verified to be equal to or greater than the value obtained by subtracting the error value 0.2 V from the reference output voltage value V2 (that is, V1≥V2−0.2) on the basis of the verification result in Step S820, the reverse current prevention apparatus 180 compares the current supply voltage value V3 with the previous supply voltage value V3_old in Operation S840.

The reason for that is that when the output voltage value V1 of the DC-DC converter 100 is verified to be equal to or greater than the value obtained by subtracting the error value 0.2 V from the reference output voltage value V2 (that is, V1≥V2−0.2), this is a situation in which a reverse current is not generated at the DC-DC converter 100 according to the comparison result of the current output voltage value V1 and the reference output voltage value V2, but there may occur a situation in which the switch 131 of the synchronous rectification circuit 130 should be controlled to be in an ON or OFF state due to the following reason.

Generally, a difference exists between the reference output voltage value V2 and an output voltage (that is, Vout=V1) of the DC-DC converter 100, wherein the reference output voltage value V2 is a reference value that is varied according to a situation of a system. Here, when the reference value V2 is instantaneously varied, the output voltage Vout converges on the reference output voltage value V2. Consequently, the switch 131 of the synchronous rectification circuit 130 should be unconditionally controlled to be in the OFF state when a value obtained by subtracting a preset error value from the reference output voltage value V2 is controlled to be greater than the output voltage value V1, but when a value obtained by subtracting the preset error value from the reference output voltage value V2 is controlled to be equal to or less than the output voltage value V1, a state of the switch 131 of the synchronous rectification circuit 130 should be controlled through the verification process once more instead of unconditionally controlling the switch 131 of the synchronous rectification circuit 130 to be in the OFF state.

In particular, when the output voltage value V1 of the DC-DC converter 100 is verified to be equal to or greater than the value obtained by subtracting the error value 0.2 V from the reference output voltage value V2 (that is, V1≥V2−0.2) based on the verification result in Step S820, the current supply voltage value V3, which is determined according to a difference between the output voltage value V1 of the DC-DC converter 100 and the reference output voltage value V2 thereof, is compared with the previously (shortly before) determined supply voltage value V3_old.

When the current supply voltage value V3 is verified to be less than the previous supply voltage value V3_old on the basis of the verification result in Operation S840, the reverse current prevention apparatus 180 counts up a number of times (a number of times of verification) that the current supply voltage value V3 is verified to be less than the previous supply voltage value V3_old (that is, Y=Y+1) in Operation S850. That is, when the output voltage value V1 of the DC-DC converter 100 is verified to be equal to or greater than the value obtained by subtracting the error value 0.2 V from the reference output voltage value V2 (that is, V1≥V2−0.2), the reverse current prevention apparatus 180 may count up and accumulate the number of times of verification Y whenever the current supply voltage value V3 is verified to be less than the previous supply voltage value V3_old (that is, V3<V3_old).

Further, it is verified whether the counted number of times of verification Y (that is, the accumulated number of times that the output voltage value V1 of the DC-DC converter 100 is verified to be equal to or greater than the value obtained by subtracting the error value 0.2 V from the reference output voltage value V2, and the current supply voltage value V3 is verified to be less than the previous supply voltage value V3_old) exceeds a preset number of times (a second number of times) Z (that is, Y>Z) in Step S860. Here, the second number of times Z is a preset value, and may be varied according to a response characteristic of a product (a vehicle battery system or a DC-DC converter of a vehicle battery system) and may be preset and changed in advance so as to recognize a voltage drop.

When the number of times of verification Y exceeds the second number of times Z (that is, Y>Z) based on the verification result in Step S860, the reverse current prevention apparatus 180 performs Step S830 for controlling the switch 131 of the synchronous rectification circuit 130 to be in the OFF state. That is, when the accumulated number of times of verification Y that the output voltage value V1 of the DC-DC converter 100 is verified to be equal to or greater than the value obtained by subtracting the error value 0.2 V from the reference output voltage value V2 and the supply voltage value V3 is verified to be less than the previous supply voltage value V3_old exceeds the second number of times Z (that is, Y>Z), the reverse current prevention apparatus 180 controls the switch 131 of the synchronous rectification circuit 130 to be in the OFF state. Hereinafter, for convenience of description, such an operation will be referred to as a control operation according to Mode 2. As described above, when the switch 131 of the synchronous rectification circuit 130 is controlled to be in the OFF state according to Mode 2, an output current of the DC-DC converter 100, a current of the low voltage battery 160, the output voltage value V1 of the DC-DC converter 100, the reference output voltage value V2, and the supply voltage value V3 may be varied as shown in FIG. 6.

At this point, when controlling the switch 131 of the synchronous rectification circuit 130 to be in the OFF state according to Mode 2, the reverse current prevention apparatus 180 determines the previous supply voltage value V3_old to a current supply voltage value V3 that is calculated using a currently measured output voltage value V1 of the DC-DC converter 100 and a currently set reference output voltage value V2 thereof (that is, V3_old=V3), and then resets the number of times of verification Y to 0 in Step S830.

In addition, the reverse current prevention apparatus 180 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2 thereof, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

When the current supply voltage value V3 is verified to be equal to or greater than the previous supply voltage value V3_old (that is, V3≥V3_old) based on the comparison result of the current supply voltage value V3 and the previous supply voltage value V3_old and the verification result in Step S840, the reverse current prevention apparatus 180 controls the switch 131 of the synchronous rectification circuit 130 to be in an ON state in Step S870. That is, the reverse current prevention apparatus 180 maintains the ON state when the switch 131 of the synchronous rectification circuit 130 is previously in the ON state, whereas it switches the OFF state to the ON state when the switch 131 of the synchronous rectification circuit 130 is previously in the OFF state.

At this point, the reverse current prevention apparatus 180 determines the previous supply voltage value V3_old to the current supply voltage value V3 that is calculated using the currently measured output voltage value V1 of the DC-DC converter 100 and the currently set reference output voltage value V2 thereof (that is, V3_old=V3). Also, the number of times of operation N and the number of times of verification Y are reset to 0, respectively.

In addition, the reverse current prevention apparatus 180 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

Meanwhile, when the current supply voltage value V3 is verified to be less than the previous supply voltage value V3_old (that is, V3<V3_old) based on of the comparison result of the current supply voltage value V3 and the previous supply voltage value V3_old and the verification result in Step S840 to count up (accumulate) the number of times of verification Y in Step S850, and the counted (accumulated) number of times of verification Y is equal to or less than the second number of times Z based on the verification result in Step S860, the reverse current prevention apparatus 180 performs Step S870 in which the switch 131 of the synchronous rectification circuit 130 is controlled to be in the ON state. Similarly, in this case, the reverse current prevention apparatus 180 determines the previous supply voltage value V3_old to the current supply voltage value V3 that is calculated using the currently measured output voltage value V1 of the DC-DC converter 100 and the currently set reference output voltage value V2 thereof (that is, V3_old=V3), and resets the number of times of operation N being counted until now to 0.

Further, the reverse current prevention apparatus 180 stores a value (a variation amount of the supply voltage, that is, ΔV=V3−V3_old), which is obtained by subtracting the prestored previous supply voltage value V3_old from the supply voltage value V3 that is determined through the current output voltage value V1 of the DC-DC converter 100 and the reference output voltage value V2 thereof, in the separate memory. When a previous variation amount of the supply voltage ΔV_old has been stored in the separate memory, the controller 183 stores the currently obtained variation amount of the supply voltage ΔV at the previous variation amount of the supply voltage ΔV_old (that is, ΔV_old=ΔV).

Through the above described process, the reverse current prevention apparatus 180 may adaptively control the switch 131 of the synchronous rectification circuit 130 to be in the OFF or ON state using the output voltage value V1 of the DC-DC converter 100, the reference output voltage value V2 thereof, and the supply voltage value V3. For example, voltage levels of the output voltage value V1 of the DC-DC converter 100, the reference output voltage value V2 thereof, and the supply voltage value V3 may be shown as in FIG. 7 according to a state control of the switch 131 of the synchronous rectification circuit 130 in Mode 1 and Mode 2.

As described above, in accordance with an exemplary embodiment of the present invention, generation of a reverse current in a DC-DC converter of a vehicle may be prevented by verifying in advance a condition in which the reverse current is generated and blocking a cause related thereto using variables that could be verified through a conventional sensing circuit of the DC-DC converter of a synchronous rectification type in the vehicle.

Moreover, in accordance with an exemplary embodiment of the present invention, a separate hardware circuit is not added or changed and a sensor for sensing a reverse current is omitted so as to prevent a reverse current in a DC-DC converter of a vehicle so that the number of components may be reduced to realize reduction of manufacturing costs, a simplified process, and weight reduction.

The measurement portion 181, verification portion 182 and controller 183, and/or one or more components of these measurement portion 181, verification portion 182 and controller 183 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the various measurement portion 181, verification portion 182 and controller 183 and/or one or more components of thereof may include or otherwise be associated with one or more memories (not shown) including code (e.g., instructions) configured to cause the various measurement portion 181, verification portion 182 and controller 183 and/or one or more components of thereof to perform one or more of the features, functions, processes, etc., described herein.

The memories may be any medium that participates in providing code to the one or more software, hardware, and/or firmware components for execution. If implemented in software, the functions may be stored as one or more instructions or code on a non-transitory computer-readable medium or non-transitory processor-readable medium. Such medium or memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments have been described with reference to a number of illustrative embodiments thereof, it should be understood that numerous other modifications and embodiments can be devised by those skilled in the art without changing the technical spirit and feature of the principles of this disclosure. The exemplary embodiments disclosed herein, therefore, are not to be taken in a sense of limiting the technical concept of the present invention but as an explanation thereof, and the range of the technical concept is not limited to these embodiments. The scope of the present invention should be construed by the appended claims, along with the full range of alterations or modifications derived from equivalents to which such claims are entitled.

What is claimed is:

1. An apparatus for preventing a reverse current in a direct current (DC)-DC converter of a vehicle, comprising:
a measurement circuit configured to measure an output voltage of the DC-DC converter of the vehicle;
a verification circuit configured to verify a difference between the output voltage and a preset reference output voltage at every preset period;
a controller configured to control a switch of a synchronous rectification circuit, which is implemented at a secondary side of a main transformer of the DC-DC converter, to be in an ON or OFF state according to the difference between the output voltage and the preset reference output voltage;
wherein the verification circuit verifies whether a value of the output voltage is less than a value that is obtained by subtracting a preset error from a value of the preset reference output voltage; and
the controller is configured to control the switch of the synchronous rectification circuit to be in an OFF state when the value of the output voltage is verified through the verification circuit to be less than the value that is obtained by subtracting the preset error from the value of the preset reference output voltage.

2. The apparatus of claim 1, wherein the controller is configured to count up a number of times of operation that the switch of the synchronous rectification circuit is controlled to be in the OFF state, and to control the switch to be in the OFF state regardless of the verification result of the verification circuit when the number of times of operation is equal to or greater than a preset first number of times.

3. The apparatus of claim 2, wherein the controller is configured to control a state of the switch by comparing a current supply voltage of the DC-DC converter, which is determined according to the output voltage and the preset reference output voltage, with a prestored previous supply voltage when the value of the output voltage is verified through the verification circuit to be equal to or greater than the value that is obtained by subtracting the preset error from the value of the preset reference output voltage.

4. The apparatus of claim 3, wherein the controller is configured to control the switch to be in the OFF state when the current supply voltage is verified to be less than the prestored previous supply voltage, and to control the switch to be in the ON state when the current supply voltage is equal to or greater than the prestored previous supply voltage.

5. The apparatus of claim 3, wherein the controller is configured to count up a number of times of verification that the value of the output voltage is verified through the verification circuit to be equal to or greater than the value obtained by subtracting the preset error from the value of the preset reference output voltage and the current supply voltage is verified to be less than the prestored previous supply voltage, and to control the switch to be in the OFF state when the number of times of verification is greater than a second number of times and the switch to be in the ON state when the number of times of verification is equal to or less than the second number of times.

6. The apparatus of claim 5, wherein the controller is configured to reset the number of times of verification to 0 when the switch is controlled to be in the OFF state and the current supply voltage is verified to be equal to or greater than the prestored previous supply voltage, and to reset the number of times of operation to 0 when the switch is controlled to be in the ON state.

7. A method for preventing a reverse current in a DC-DC converter of a vehicle, comprising:
measuring an output voltage of the DC-DC converter of the vehicle;
verifying a difference between the output voltage and a preset reference output voltage at every preset period;
controlling a switch of a synchronous rectification circuit, which is implemented at a secondary side of a main transformer of the DC-DC converter, to be in an ON or OFF state according to the difference between the output voltage and the preset reference output voltage;
wherein the verifying verifies whether a value of the output voltage is less than a value that is obtained by subtracting a preset error from a value of the preset reference output voltage; and
the controlling controls the switch of the synchronous rectification circuit to be in an OFF state when the value of the output voltage is verified in the verifying to be less than the value that is obtained by subtracting the preset error from the value of the preset reference output voltage.

8. The method of claim 7, wherein the controlling counts up a number of times of operation that the switch of the synchronous rectification circuit is controlled to be in the OFF state, and controls the switch to be in the OFF state regardless of the verification result of the verifying when the number of times of operation is equal to or greater than a preset first number of times.

9. The method of claim 8, wherein the controlling controls a state of the switch by comparing a current supply voltage of the DC-DC converter, which is determined according to the output voltage and the preset reference output voltage, with a prestored previous supply voltage when the value of the output voltage is verified in the verifying to be equal to or greater than the value that is obtained by subtracting the preset error from the value of the preset reference output voltage.

10. The method of claim 9, wherein the controlling controls the switch to be in the OFF state when the current supply voltage is verified to be less than the prestored previous supply voltage, and controls the switch to be in the ON state when the current supply voltage is equal to or greater than the prestored previous supply voltage.

11. The method of claim 9, wherein the controlling counts up a number of times of verification that the value of the output voltage is verified in the verifying to be equal to or greater than the value obtained by subtracting the preset error from the value of the preset reference output voltage and the current supply voltage is verified to be less than the prestored previous supply voltage, and controls the switch to be in the OFF state when the number of times of verification is greater than a second number of times and to be in the ON state when the number of times of verification is equal to or less than the second number of times.

12. The method of claim 11, further comprising:
resetting the number of times of verification to 0 when the switch is controlled to be in the OFF state and the current supply voltage is verified to be equal to or greater than the prestored previous supply voltage, and
resetting the number of times of operation to 0 when the switch is controlled to be in the ON state.

* * * * *